US006524934B1

(12) United States Patent
Lorimer

(10) Patent No.: US 6,524,934 B1
(45) Date of Patent: Feb. 25, 2003

(54) METHOD OF MANUFACTURE FOR GENERATION OF HIGH PURITY WATER VAPOR

(76) Inventor: D'Arcy H. Lorimer, 230 Houston Way, Pismo Beach, CA (US) 93449

( * ) Notice: Subject to any disclaimer, the term of this patent is extended or adjusted under 35 U.S.C. 154(b) by 0 days.

(21) Appl. No.: 09/429,224

(22) Filed: Oct. 28, 1999

(51) Int. Cl.⁷ .............................................. H01L 21/326

(52) U.S. Cl. ........................ 438/477; 134/26; 134/30; 134/31; 210/80; 210/181

(58) Field of Search .................... 438/477; 134/30, 134/26, 31; 210/180, 181

(56) References Cited

U.S. PATENT DOCUMENTS

| | | | | |
|---|---|---|---|---|
| 4,735,704 A | * | 4/1988 | Kister et al. | |
| RE33,355 E | * | 9/1990 | Itoh et al. | |
| 5,124,033 A | | 6/1992 | Ohmi et al. | 210/181 |
| 5,202,096 A | * | 4/1993 | Jain | |
| 5,439,596 A | | 8/1995 | Ohmi et al. | 210/748 |
| 5,589,005 A | | 12/1996 | Ohmi | 134/30 |
| 5,736,017 A | | 4/1998 | Moriguchi et al. | 204/253 |
| 5,866,745 A | | 2/1999 | Gartside et al. | 585/653 |
| 6,238,460 B1 | * | 5/2001 | Deng et al. | |

FOREIGN PATENT DOCUMENTS

| | | |
|---|---|---|
| EP | 0666237 | 10/1993 |
| EP | 0878443 | 11/1998 |
| JP | 09020501 | 1/1997 |
| JP | 10007403 | 1/1998 |
| JP | 10270437 | 10/1998 |
| JP | 10297907 | 11/1998 |
| WO | WO 94/07795 | 4/1994 |
| WO | WO 97/28085 | 8/1997 |
| WO | WO 97/48640 | 12/1997 |

OTHER PUBLICATIONS

Toshifumi Murata, Hideo Yusa, Kunio Kamiya; Nov. 1968; *Hitachi Review*, vol. 17, No. 12.

D.I Weissman–Wenocur and W.E. Spicer; Comparison Between the Catalytic Activities of Pd(111) and Pd–Au(111) for Water Synthesis; Jun. 1983; *Surface Science*, pp. 499–515.

G. Peteresen, H.M. Dannetun, and I Lundstrom; Water Production on Palladium in Hydrogen–Oxygen Atmospheres; Feb. 1985; *Surface Science*, pp. 273–284.

* cited by examiner

Primary Examiner—Long Pham

(57) ABSTRACT

The present invention increases the safety of a reactor for generating water vapor from oxygen and hydrogen, provides ultra-pure water vapor in an amount necessary for practical use safely, stably and continuously, provides ultra-pure water vapor concentrations to nearly 100 percent without the need of an inert transporting gas, and provides a catalyst with long term, high catalytic activity within the reactor. Specifically, the system comprises a catalyst vessel and a plurality of sorption vessels. The catalyst vessel is made of a heat-resistant material and includes an inlet and an outlet for water vapor and inert gas mixture, a heat source, and has a platinum or palladium catalyst within the catalyst vessel. The sorption vessels are made of a heat-resistant material and includes an inlet and an outlet for water vapor and inert gas mixture, a heat source, and has a molecular sieve water vapor sorption material within the sorption vessel. Hydrogen, oxygen and an inert gas fed from the inlet of the reactor vessel contacts the catalyst to enhance reactivity, thereby producing water from hydrogen and oxygen. The water vapor and inert gas mixture flows from the reactor vessel to the sorption vessel, where the water vapor and inert gas mixture contacts the sorption material. The sorption material sorbs the water vapor from the water vapor and inert gas mixture. The inert gas is exhausted. Then, the water vapor and inert gas mixture flowing from the reactor vessel to the sorption vessel is stopped. Then, the sorption vessel heated to release ultra-pure water vapor. A temperature of the sorption material determines the flowrate of the water vapor from the system.

16 Claims, 16 Drawing Sheets

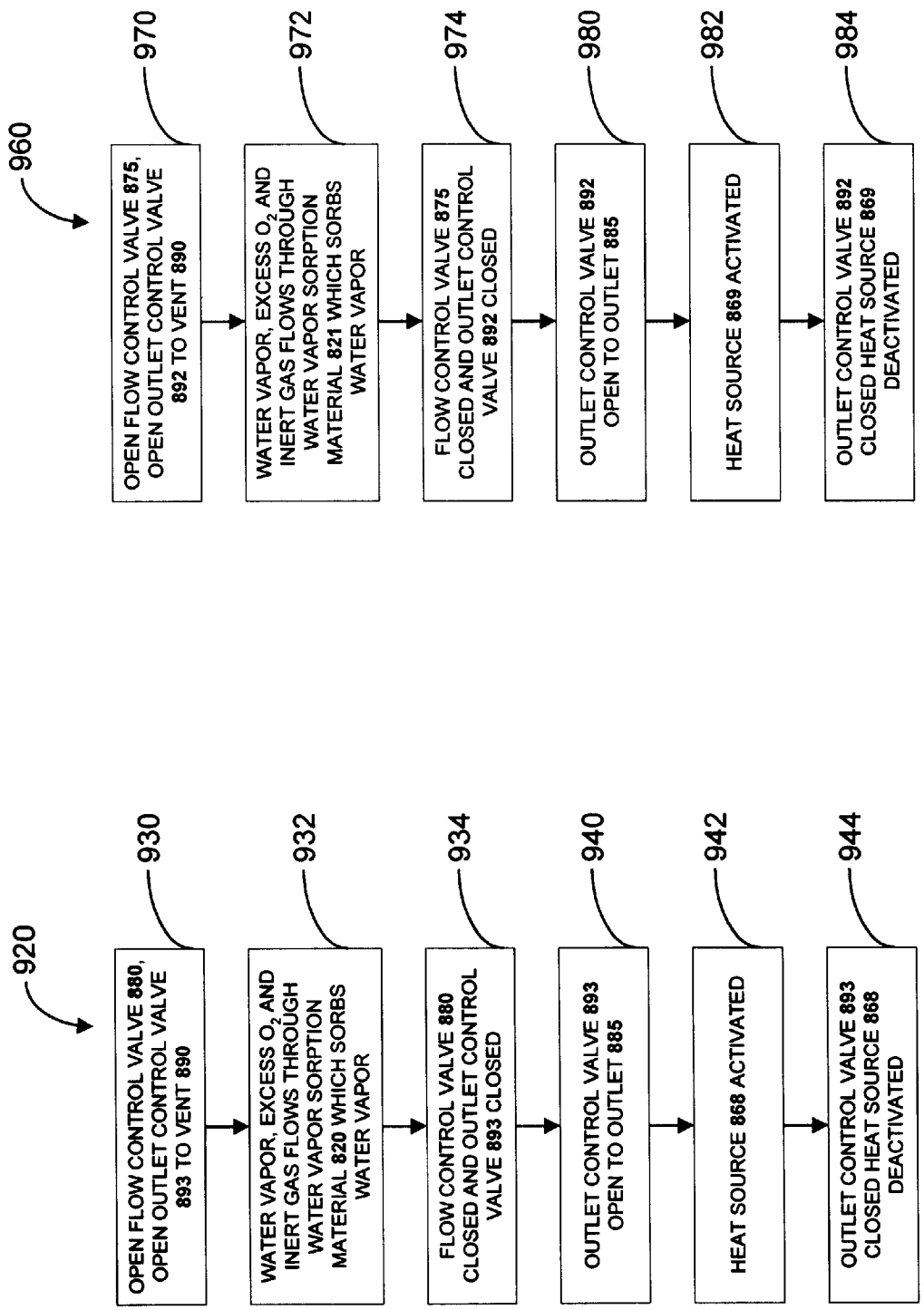

Equilibrium water content, 1 ATM partial pressure

Equilibrium water content at 1 Atm vapor pressure

METHOD OF MANUFACTURE FOR GENERATION OF HIGH PURITY WATER VAPOR

DESCRIPTION

1. Technical Field

The present invention is related to generation of water vapor. More specifically, the present invention is a method and apparatus for generating ultra-pure water vapor without utilizing an inert transporting gas.

2. Background Art

Ultra-pure water vapor is utilized in many applications and industries. One such use is for affixing a silicon oxide film by the water oxidation method in semiconductor and integrated circuit manufacturing processes. Another such use can be as an auxiliary reactant used during plasma photo resist stripping to aid in the removal of inorganic residues.

A first method to produce ultra-pure water vapor is a system to boil high purity water. Such a system is typically referred to as a boiler. FIG. 1 illustrates a prior art boiler system. The boiler system includes a chamber 100 for boiling the water, a water inlet 105, an upstream water purification and filtering system 110, a heat source 115, a water vapor outlet 120, an outlet pressure and flow controlling device 125, and a control and instrumentation system 130. Water is purified and filtered in the upstream water purification and filtering system 110 prior to introduction to the chamber 100. Heat is applied to the chamber 100 to produce steam (water vapor). The water vapor is then piped to the point of use through the outlet pressure and flow controlling device 125.

The boiler method of producing water vapor has several significant short falls that renders a boiler ineffective for use in semiconductor manufacturing operations.

First, a boiler system will concentrate the impurities contained in the water it is boiling. If the water flowing into the boiler has been purified and filtered to low parts per million (PPM) or better impurity levels, the majority of the trace impurities will remain in the chamber 100 when the water vapor is released. This leads to a concentration of impurities in the chamber 100. As time passes, the amount of impurities leaving the boiler can increase due to aerosols leaving with the saturated water vapor. These aerosols can be formed at the gas/liquid interface as vapor bubbles that rise to the surface, break and "splatter" liquid droplets into the vapor phase. Since these aerosols are formed from liquid in the boiler, the aerosols contain the same level of continuously increasing impurities. These high impurity levels can contaminate the product water vapor and the downstream delivery system.

Second, a boiler method is typically controlled by a feedback control process monitoring the pressure through the outlet pressure and flow controlling device 125 and adjusting the heat source 115, to maintain a constant pressure. This often results in oscillation and instability in the output flow, particularly when transient or non-steady state flow rates are required. This oscillation effect can further increase the formation of aerosols-described above.

A second method of producing high purity water vapor is referred to as a bubbler. FIG. 2 illustrates a prior art bubbler system. A bubbler consists of a sealed chamber 200 which is isolated from the out side air, a water inlet 205, an upstream water purification and filtering system 210, a heat source 215, a water vapor outlet 220, an inert gas inlet 230 and an inert gas flow control device 225.

The chamber 200 contains a quantity of water 235 therein, maintained at a freely selected constant temperature. An inert gas enters through the inert gas inlet 230 and passes through the water. The result is an inert gas which contains a water component corresponding to the vapor pressure of water at the freely selected temperature. The control of the water concentration is accomplished by means of the temperature and vapor pressure relationship within the chamber 200.

The bubbler method has several short falls. Accurate control of the water vapor concentration leaving the bubbler is dependant on the assumption that the carrier vapor achieves vapor liquid equilibrium with the bulk water. This requires accurate control of the liquid temperature, bubble sizes and distribution, bubble residence time in the water, and total operating pressure. In practice, simultaneous control of all these variables is difficult, and oscillations are likely to occur when transient or non-steady state flow rates are required. Obtaining pure water vapor is not possible with this method, due to the use of an inert gas to create the carrier bubbles. Impurity build-up similar to that experienced in a boiler system would also occur in this method.

A third method for generating high purity water vapor is one in which a standard gas contained in a cylinder is diluted. FIG. 3 illustrates a gas dilution type system. A dilution system includes a cylinder 300, containing a quantity of inert gas 305, with the inert gas having a known concentration of water vapor. A dilution system also includes an inert gas flow control 310, a diluent inert gas inlet 315, a diluent inert gas flow control 320, and an outlet 325.

In the dilution method, the inert gas 305 is diluted to a selected dilution ratio using a quantity of diluent inert gas from the diluent inert gas inlet 315. The water vapor concentration of the resulting gas mixture is determined by the inert gas flow control 310 and the diluent inert gas flow control 320.

The dilution method also has several shortfalls. First, the reliability of the water concentration is low since there are no standard gases having highly accurate water concentrations. Second, it i difficult to generate high concentrations and large quantities of water vapor, and by definition, generation of pure water vapor is not possible. The mixture being diluted cannot have a water concentration higher than the dew point at ambient conditions, or liquid condensation inside the storage container will result. Heating the container will increase the available concentration, but doing so is not practical in modem semiconductor fabs, and will also exhibit similar problems to that described in the boiler system above.

A fourth method of producing high purity water vapor is commonly referred to as combustion in a quartz diffusion furnace or, more simply, combustion. FIG. 4a illustrates a gas combustion system. A gas combustion system includes a combustion chamber 400, an ultra-pure oxygen inlet 405, an ultra-pure hydrogen inlet 410, an oxygen flow control 415, a hydrogen flow control 420, an outlet 425, a hydrogen gas nozzle 430, a Si chip 435 for ignition held in a vicinity of a top side of the hydrogen gas nozzle 430, and a heating lamp 440 for heating the Si chip 435.

A vicinity at the tip end of the hydrogen gas nozzle 430 inside the chamber 400 attains a high temperature from about 1800° C. to 2000° C. due to flames of combustion. In addition, the amount of oxygen gas supplied to the chamber 400 is set to a level exceeding one half that of the hydrogen gas in order to completely combust the hydrogen gas $H_2$ and have excess oxygen remaining. This maintains safer operation of the system.

The combustion method achieves excellent practical effects in that high purity water is generated and can be instantaneously generated at a rate of several liters per minute. However, in this method, there is a problem in that if the flow rate of hydrogen gas or oxygen gas is reduced to decrease the water amount, combustion can easily be stopped. It is therefore, extremely difficult to provide controls for decreasing the amount of water vapor which is generated. The control range of a ratio of water vapor to oxygen is narrow. As a result, production of pure water vapor over wide pressure and flow rate ranges is very difficult, and may not be possible for systems requiring on/off flow rate demands.

The combustion method has an additional difficulty in that when combustion stops, raw gas is fed directly into the outlet 425. An interlock mechanism becomes indispensable to prevent a hydrogen gas explosion when combustion stops. This adds additional complexity and cost.

In addition, there is also a problem that when the gas flow rate is reduced, flames are generated in the vicinity of the nozzle 430, $SiO_2$ material in the nozzle 430 begins to evaporate. $SiO_2$ becomes volatile and mixes in the reactor atmosphere of $H_2O+O_2$ gas and contaminates the $H_2O+O_2$ gas fed to the semiconductor manufacturing equipment to such an extent that it is no longer suitable for use in manufacturing high-performance semiconductors. Yet another difficulty with the combustion method is the high temperature of the chamber 400. The chamber temperature can exceed 700° C. and poses personnel safety risks.

FIG. 4b illustrates a modification to the gas combustion method. This modification limits the explosion concerns by mixing an inert gas with the hydrogen and oxygen gases. The modification adds an ultra-pure inert gas inlet 430, and an inert gas flow control 435. The inert gas can also be added to the hydrogen in a premixed, commercially available reagent known as "forming gas". The ratio of an inert gas including argon to hydrogen is limited so that hydrogen does not exceed a relatively low level such as 8% and typically 4% to 6% of the resulting mixture. 8% hydrogen in air or oxygen containing atmospheres is generally accepted as the lowest concentration at which hydrogen could cause an explosion. This modification results in a safer combination of hydrogen and oxygen but also limits the water vapor produced to no more than the concentration of hydrogen. In addition, a large quantity of inert gas is introduced into the system and accompanies the water vapor out the outlet 425.

The FIG. 4b method reduces the risk of hydrogen explosion while everything is operating properly and all gases are flowing at the correct flow rates. This method does not address other combustion method short falls including: precise placement of gas injection nozzles; and high reactor temperatures. In addition, the output gas of this method is approximately 90% inert gas.

FIG. 4c illustrates a further modification to the combustion method. This modification adds a catalytic material 440 to the inner volume of the combustion chamber 400. This modification is described in detail in European Patent Application EP0878443A1 by Ohmi et al, (Ohmi) which is hereby incorporated by reference in it's entirety. Ohmi teaches a method of mixing purified hydrogen gas and purified oxygen gas in a reactor similar to the combustion method described above, but limits the temperature of the reactor to below hydrogen's auto-ignition temperature. To ensure complete reaction of the hydrogen, the reactor contains a catalyst material to aid the reaction. Ohmi also teaches the injection of an inert diluent gas to further enhance the safety of the process similar to that described in the FIG. 4b method described above. There are also commercially available systems produced by Fujikin of Japan that can produce nearly 100% water vapor from a catalytic reactor similar to that described by Ohmi. The Fujikin system, however, requires some excess oxygen for safety reasons, and therefore cannot produce high purity water vapor.

The FIG. 4c method reduces the risk of hydrogen explosion while everything is operating properly and all gases are flowing at the correct flow rates and temperatures. This method also reduces the reactor temperatures. This method adds complication and cost to the reactor by adding catalyst material coatings and gas diffusing components.

A fifth method of producing high purity water vapor is the diffusion tube method. FIG. 5 illustrates a prior art diffusion tube system. A diffusion tube system includes a diffusion tube 500, containing a quantity of porous quartz, ceramics or plastic resin material 505, a water inlet 510, an inert gas inlet 515, an inert gas and water vapor outlet 520, and a heat source 525. In this method, water is introduced into the resin material 505 in a diffusion tube 500 which is permeated by water molecules.

In the diffusion tube method, liquid water molecules migrate through the resin material 505 to an end surface 530 of the diffusion tube 500 which is exposed to the inert gas flow. A thin, liquid water film forms on the evaporating end surface 530 and then evaporates into the inert gas flowing past the end surface 530 of the diffusion tube 500. Thus water vapor is generated. The control of the water concentration is determined by the temperature of the diffusion tube, the porosity of the resin material 505 and the flow rate of the inert gas.

The diffusion tube method has several short falls. First, it is difficult to consistently control the evaporation rate. Similar to the bubbler method described in FIG. 2 above, the accuracy of the outlet water vapor concentrations relies on the assumption of obtaining vapor/liquid equilibrium at a known temperature. Control of the interface temperature is critical, but difficult, especially with non conductive porous media such as resins or quartz. The use of metal porous tubes is not recommended for purity reasons. Second, at low evaporation rates, liquid water can seep through and form droplets on the evaporating surface 530 and in the inert gas and water vapor outlet 520. Controlling water droplet formation would require additional controls, complexity and cost.

Third, as with other methods described above, delivery of transient flow rates over a wide range of pressures is also difficult. Fourth, to achieve higher evaporation rates requires large quantities of energy to the evaporating end surface 530. With plastic or quartz diffusion tubes that are basically insulating, this is very difficult to control. Heating the gas is possible, but not practical, due to the typically poor (low) heat capacity of most gasses compared to the high heat of vaporization of water, and the large variation of temperature that would result along the length of the tube. Fifth, diffusion tube 500 properties can change over time, so that the quantity of water vapor produced at a given temperature can vary. This variation over time is due, in part, to the deposit of non volatile impurities present in the liquid water in the pores leading to and immediately at the evaporation surface. Sixth, it is not possible to produce pure water vapor with this method as an inert carrier gas is required.

What is needed is a method and apparatus which is easy to control, delivers repeatable results, is capable of generating substantially 100% concentrations of ultra-pure water vapor, at high flow rates, at atmospheric pressures and above atmospheric pressures, at reduced reactor temperatures, reducing or eliminating the hydrogen explosion or auto-ignition hazards of combustion and without requiring an inert diluent gas in the delivered water vapor.

DISCLOSURE OF THE INVENTION

The present invention increases the safety of a reactor for generating water vapor from oxygen and hydrogen. The present invention provides ultra-pure water vapor in an amount necessary for practical use safely, stably and continuously, provides ultra-pure water vapor concentrations to nearly 100 percent without the need of an inert carrier gas. The purity of water vapor is not dependent on flow rate demands or transient processes.

A method of producing ultra-pure water vapor includes combining a quantity of ultra-pure hydrogen, an excess quantity of ultra-pure oxygen and a quantity of an ultra-pure inert gas in the presence of a catalyst. The resulting mixture of water vapor, excess oxygen and inert gas flows from the catalyst to a water vapor sorption material. The water vapor sorption material sorbs water vapor from the mixture and the remaining inert gas and excess oxygen flows out through a waste vent outlet. When the water vapor sorption material has absorbed a quantity of water vapor, the flow of the mixture into the water vapor sorption material is stopped. Then the water vapor sorption material is heated to cause the water vapor sorption material to release the water vapor. High concentrations and large quantities of pure water vapor then flow out of the outlet.

An apparatus for producing ultra-pure water vapor includes a reactor vessel and a plurality of sorption vessels. The reactor vessel is constructed from a heat-resistant material and includes an inlet and an outlet for water vapor and inert gas-mixture, a heat source, and has an oxidation catalyst within the reactor vessel. The sorption vessels are made of a heat-resistant material and include an inlet and an outlet for water vapor and inert gas mixture, a heat source, and have a water vapor sorption material within the sorption vessel.

Hydrogen, oxygen and an inert gas fed from the inlet of the reactor vessel contacts the catalyst to enhance reactivity, thereby producing water from hydrogen and oxygen. The water vapor and inert gas mixture flows from the reactor vessel to the sorption vessel, where the water vapor, excess oxygen, and inert gas mixture contacts the sorption material. The sorption material sorbs the water vapor from the excess oxygen and inert gas mixture. The inert gas and excess oxygen are released to an exhaust vent. Then, the water vapor and inert gas mixture flowing from the reactor vessel to the sorption vessel is stopped. The sorption vessel is heated to release ultra-pure water vapor. The temperature of the sorption material determines the pressure of the water vapor in the adsorption vessels. The flow rate of water leaving the system can be controlled by mass flow controllers or valves. Since the quantity of water remaining in the sorption vessels will decrease over time and usage, a heating control system will continuously is increase the sorption vessel temperature to maintain a constant vapor pressure consistent with the delivery demands designed into the system.

The present invention provides improved, ultra-pure water vapor generation over previous technologies. The innovative design advances the state of the art of ultra-pure water vapor generation with the advantages of increased safety, substantially 100% ultra pure water vapor at the outlet, high flow rates, at atmospheric pressures and greater than atmospheric pressures, with reduced reactor temperatures, ease of control and repeatability of results over the prior art technologies without the disadvantages of hydrogen auto-ignition or explosion hazards or an inert diluent gas in the delivered water vapor.

These and other advantages of the present invention will become apparent to those skilled in the art upon reading the following detailed descriptions and studying the various figures and drawings.

BRIEF DESCRIPTION OF THE DRAWINGS

FIG. 9b illustrates a continuation of the flow chart for a multiple vessel embodiment of the present invention.

FIG. 9c illustrates a continuation of the flow chart for a multiple vessel embodiment of the present invention.

BEST MODES FOR CARRYING OUT THE INVENTION

FIGS. 1 through 5 were discussed with reference to the prior art.

Figure 1:
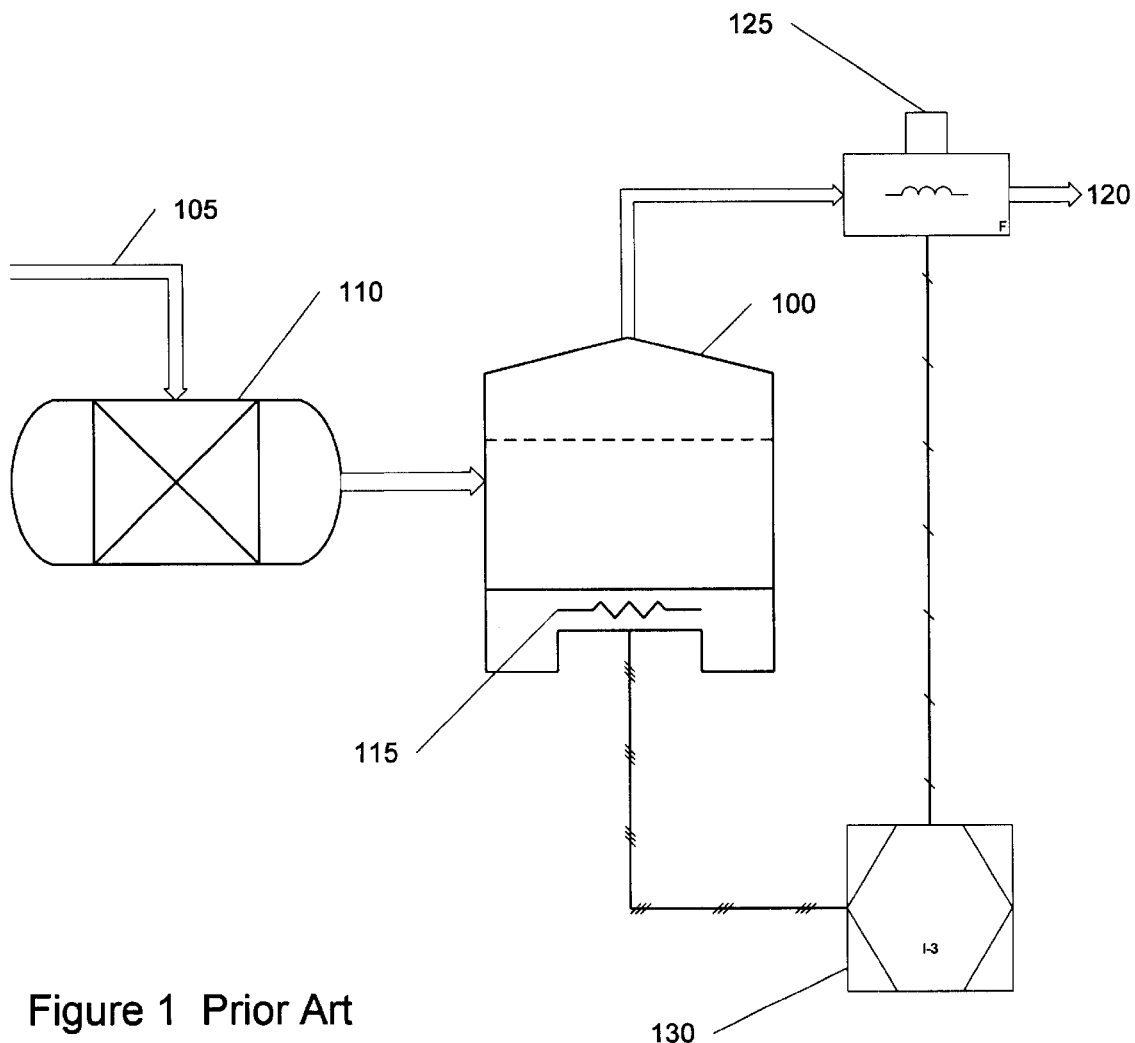
FIG. 1 illustrates a prior art boiler apparatus.
Figure 2:
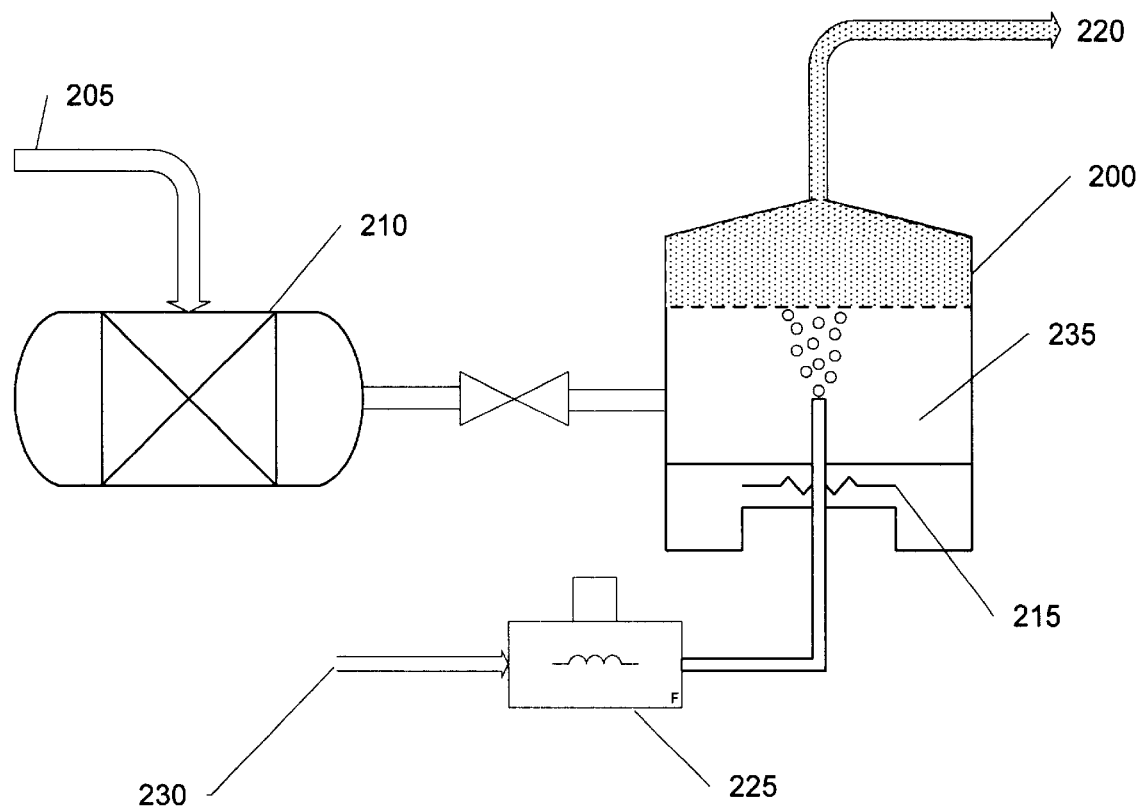
FIG. 2 illustrates a prior art bubbler apparatus.
Figure 3:
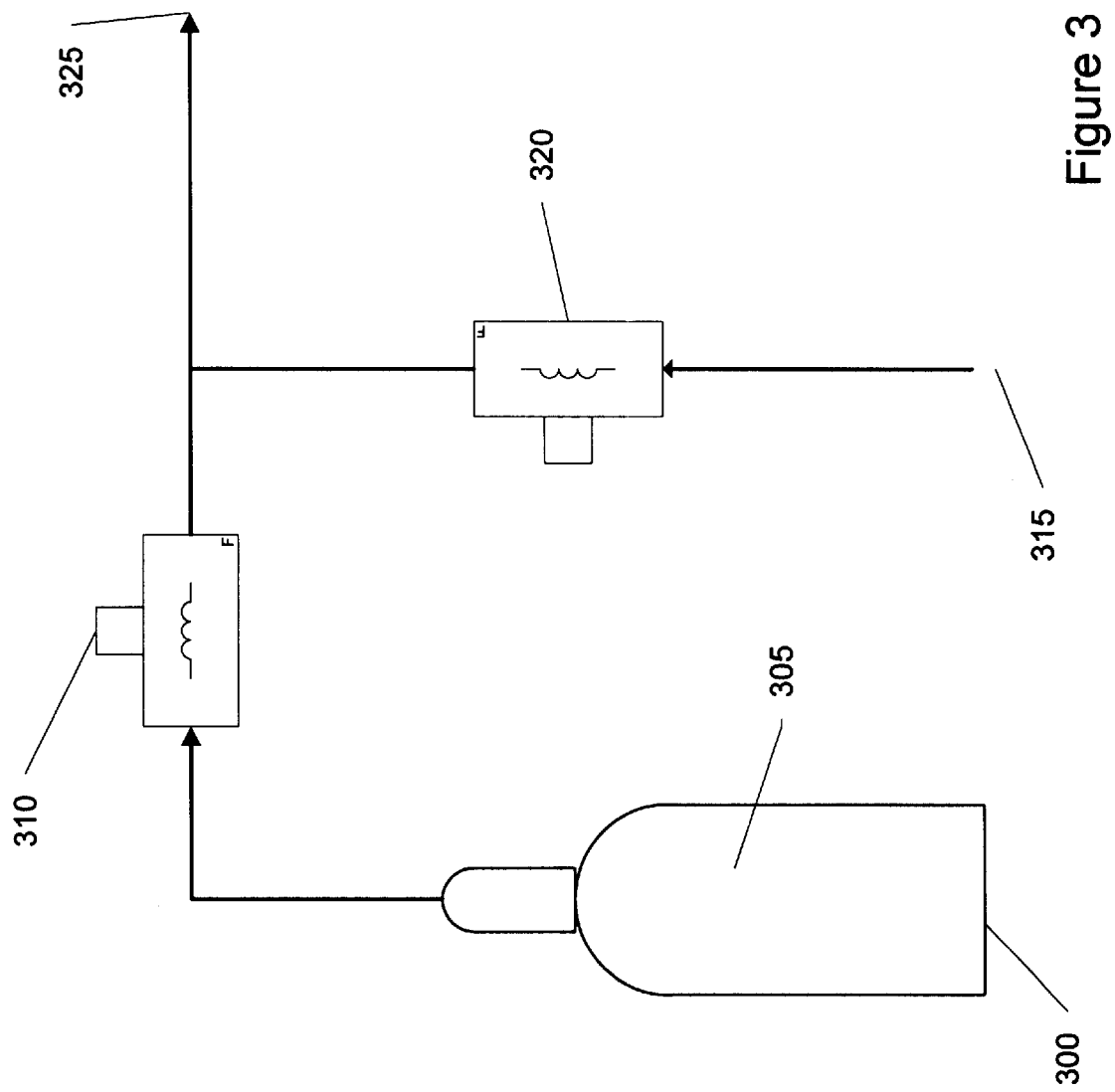
FIG. 3 illustrates a prior art dilution apparatus.
Figure 4A:
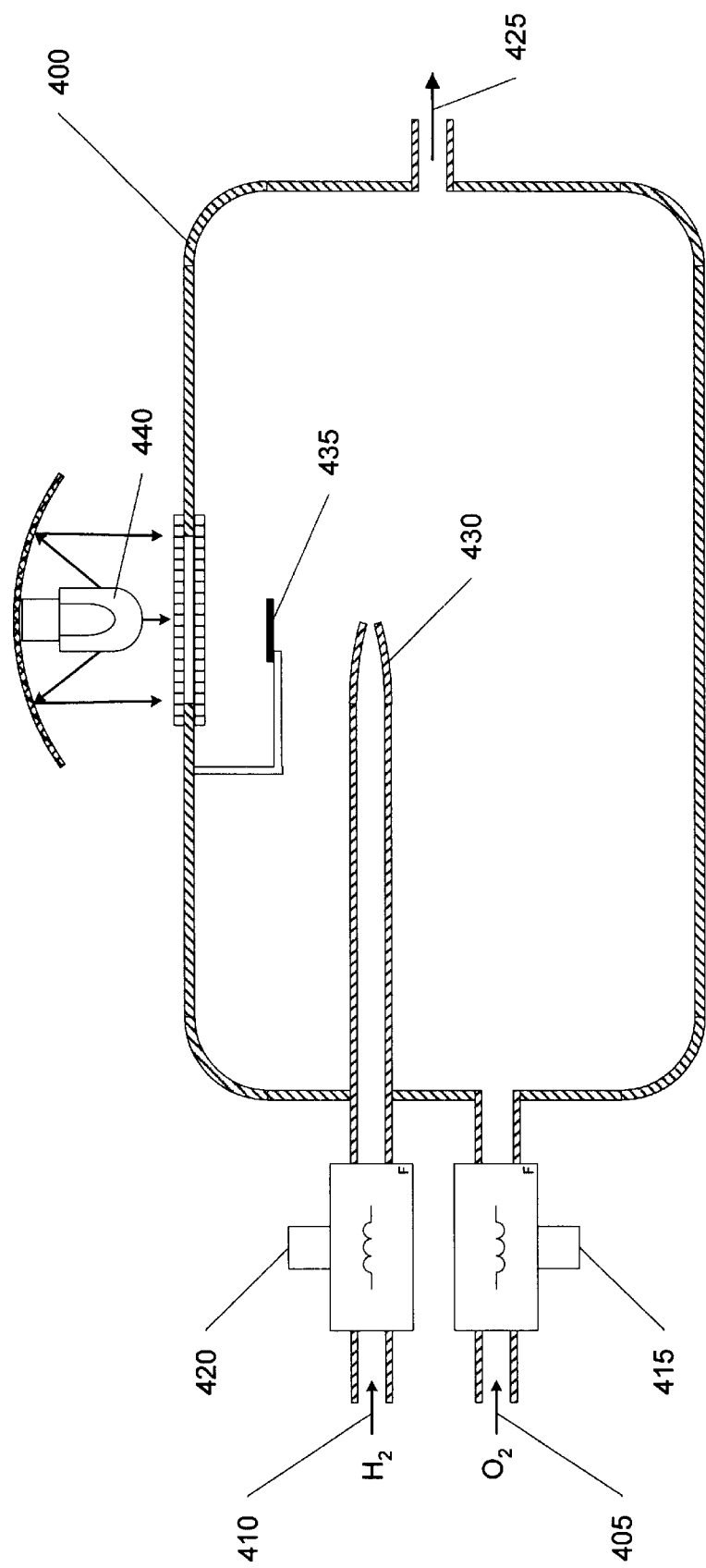
FIG. 4a illustrates a prior art combustion apparatus.
Figure 4B:
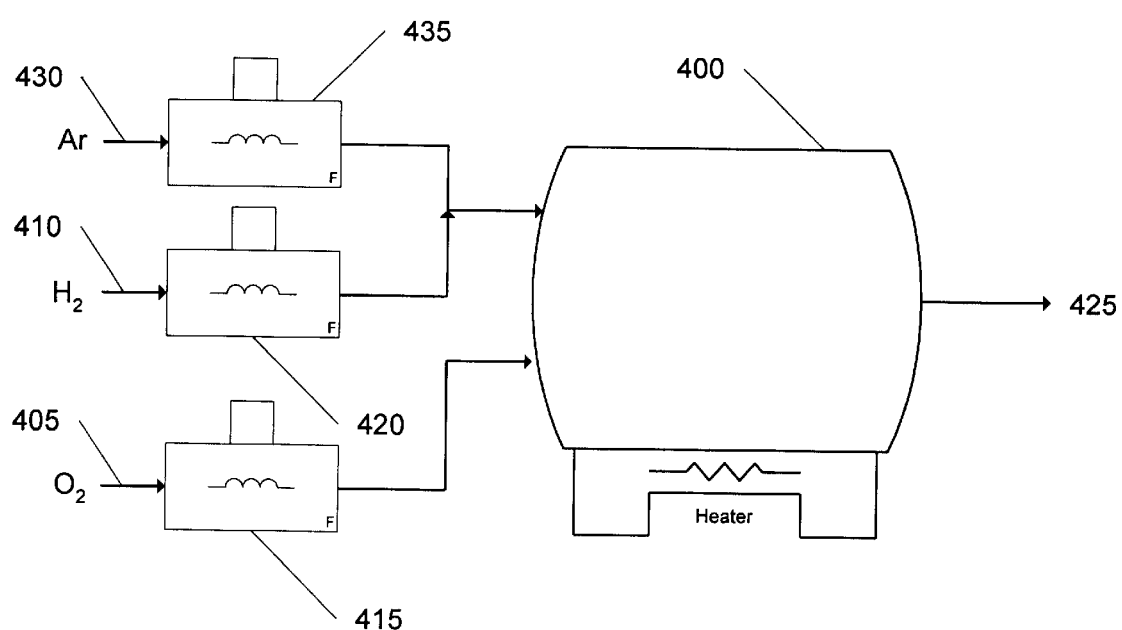
FIG. 4b illustrates a prior art modified combustion apparatus.
Figure 4C:
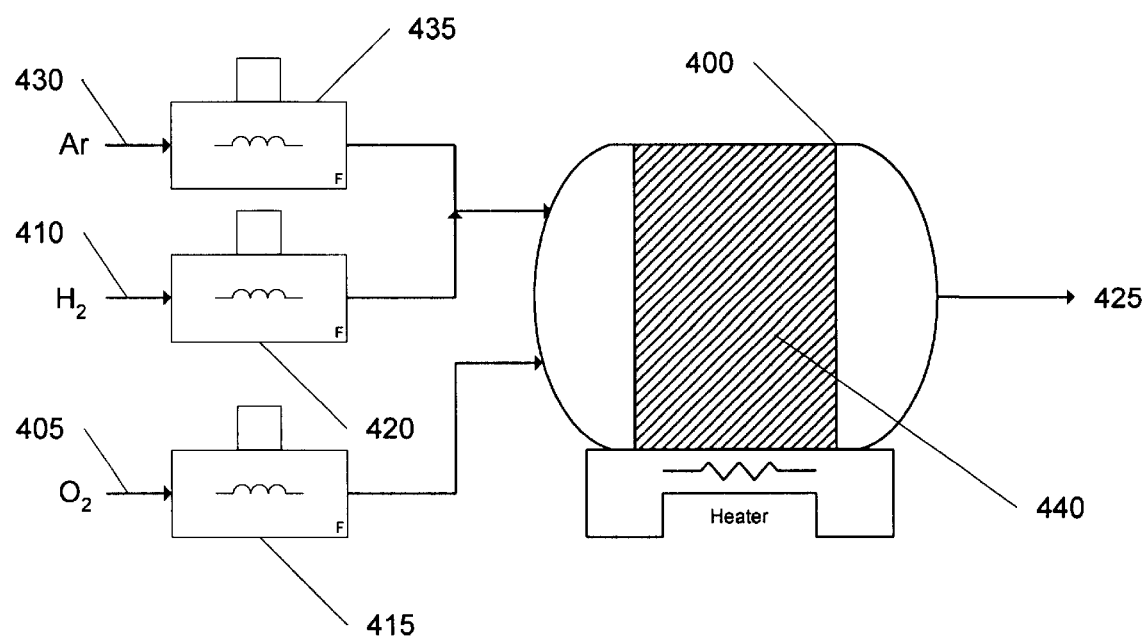
FIG. 4c illustrates a prior art modified combustion apparatus in accordance with Ohmi et al.
Figure 5:
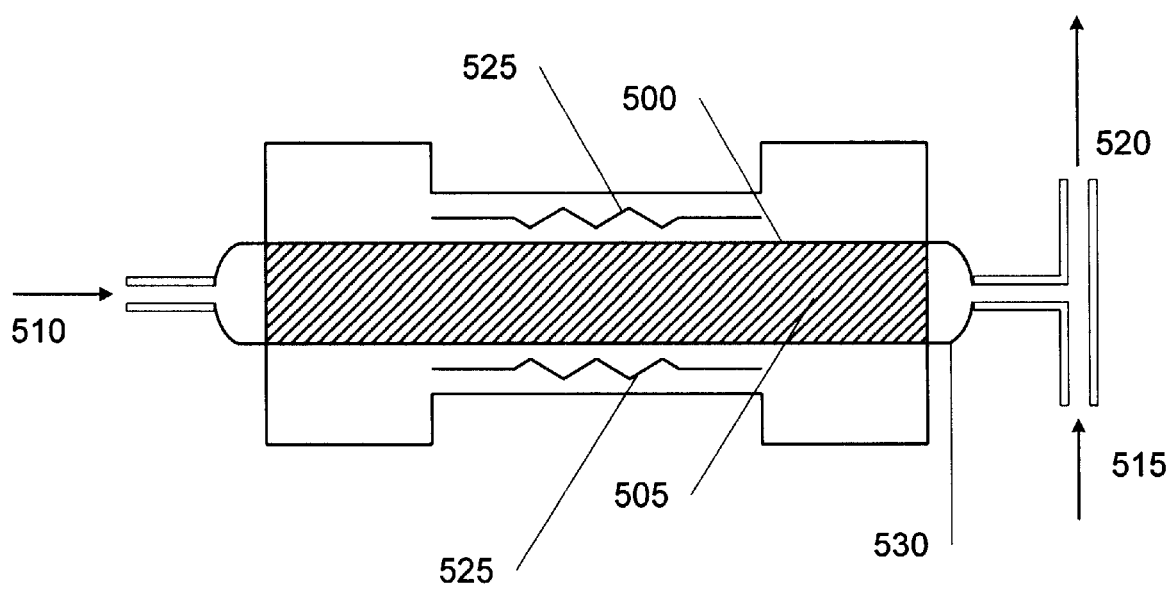
FIG. 5 illustrates a prior art diffusion tube apparatus.
Figure 6:
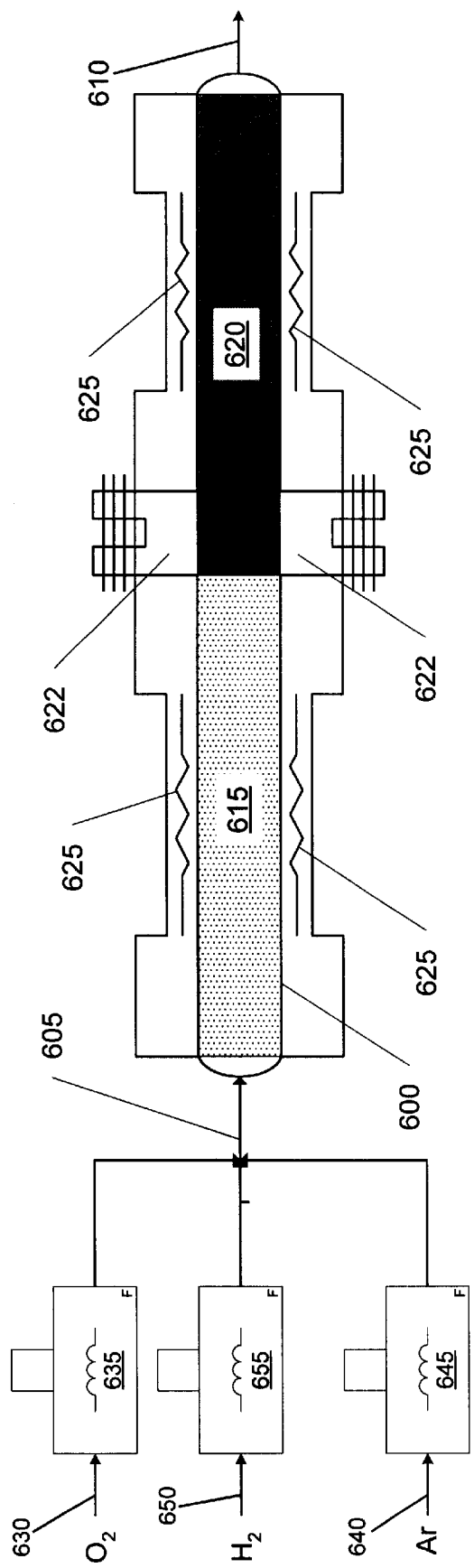
FIG. 6 illustrates a first embodiment of the present invention.

FIG. 6 illustrates a water vapor generation system in accordance with one embodiment of the present invention. The water vapor generation system includes a vessel 600 having an inlet 605 and an outlet 610. A quantity of catalyst material 615 and a quantity of water vapor sorption material 620 are included within the vessel 600. A heat source 625 is also included. An intercooling device 622 is also included between the catalyst material 615 and water sorption material 620 in vessel 600. An oxygen gas inlet 630, and an oxygen gas flow control 635, a hydrogen gas inlet 640, and a hydrogen gas flow control 645, an inert gas inlet 650, and an inert gas flow control 655 are also included and are in fluid communication with the inlet 605. The intercooling device 622 includes, a non-heated section with cooling fins on the outside of the vessel 600. The intercooling device 622 can also include an active cooling device such as water cooling coils for higher flow rates.

The water vapor generation system is preferably constructed of stainless steel and more preferably 316L stainless steel. Other grades of stainless steel and materials will also function satisfactorily. The surface finish of the vessel 600 and inlet 605 and outlet 610 is preferably such that substantially all manufacturing oil and films have been removed. Typically the surfaces in an ultra high purity system are electropolished to a 10 $R_a$ (roughness average) finish, or better, for cleaning and cosmetic purposes. A 10 $R_a$ surface finish aids in the purity performance of the system but is not required.

The vessel 600 and inlet 605 and outlet 610 are preferably assembled utilizing heterogenous welding techniques including orbital welding. Heterogenous welding also aids in the purity performance of the system. Other assembly methods including metal to metal sealing and seals utilizing crushable metal gaskets capable of performing in an ultra high purity application can also be utilized.

The vessel 600 can be cylindrical or other shapes. A cylindrical shape is illustrated in FIG. 6 for purposes of clarity. The vessel 600 can have more than one inlet 605 such that each gas has an individual inlet 605 or any combination of two gases shares an inlet 605. A single inlet is illustrated for purposes of clarity.

The catalyst material 615 can include any material from the general class of heterogeneous oxidation catalysts. This class includes base metal oxides, transition metal oxides, and precious metals. Preferably, the catalyst would be a precious metal such as palladium, platinum, rhodium, ruthenium, or alloys and mixtures thereof. The catalyst can also be a precious metal catalyst supported on a porous, high surface area, ceramic support composed of silica, alumina, or combinations and mixtures thereof, such as zeolites. The support can take the shape of powder, porous pellets or beads, or monolithic structures such as honeycombs or tube bundles containing numerous, parallel flow channels through which gas contact occurs. Most preferably, the catalyst should be a highly dispersed palladium catalyst, of between 0.01 and 5 wt. %, on a high surface area (greater than 50 square meters/gram) alumina or zeolite support.

The water vapor sorption material 620 can be chosen from molecular sieves or silica gel materials. The water vapor sorption material 620 includes either type 13x or 5A molecular sieves, commercially available from many manufacturers such as UOP, Grace, or Davidson.

The water vapor sorption material 620 is preferably located in a separate vessel from the catalyst material 615. The water vapor sorption material 620 can also be located in the vessel 600 with the catalyst material 615.

The heat source 625 is preferably divided into several resistive type rods which can be distributed to several regions of the vessel 600. Other types of heat source 625, which can also be utilized, include a single resistive element, a single or multiple radiant type source such as a high intensity lamp or lamps, or resistive type sources including a heater blanket, band heaters or combinations thereof or any method capable of heating the catalyst material 615 and the water vapor sorption material 620.

In an alternative embodiment, the heat source 625 can also be in a separate, preheater component. The preheater can utilize any of the above mentioned types of heat elements and sources. A separate preheater component can provide control advantages over other embodiments especially for applications requiring high flow rate demands such as greater than 1 $m^3$/hr.

The heat source 625 is preferably located on inside of the vessel 600. The heat source 625 can also be located on the outside of the vessel 600. If the heat source is located on the interior of the vessel 600, the heat source 625 preferably extends into the catalyst material 615 and the water vapor sorption material 620. Heat transferring extensions including fins are preferably utilized to distribute and transfer thermal energy from the heat source 625 to the water vapor sorption material 620. Heat transferring extensions are manufactured from anodized aluminum but other materials such as non-anodized aluminum, steel alloys and other similar heat transferring materials can be utilized.

The oxygen gas flow control 635, the inert gas flow control 655 and the hydrogen gas flow control 645 can be any one of several flow controlling devices including a fixed orifice, an adjustable needle valve, a mass flow controller or any method capable of controlling the inlet gas flow rate.

The inert gas is preferably mixed with the hydrogen gas external to the vessel 600. In an alternative embodiment, the inert gas and hydrogen can be purchased, premixed. Such premixed gases are known to as forming gas. In yet another embodiment, the hydrogen gas and inert gas are mixed internal to the vessel 600, but prior to the introduction of oxygen.

Ultra high purity gas is defined as gas which is 99.9999999% pure by volume. Ultra high purity hydrogen, ultra high purity oxygen and ultra high purity inert gas, as inlet gases, will yield ultra high purity water vapor. Lesser qualities of gas will yield lesser quality water vapor. The inert gas can be nitrogen or any noble gas i.e. helium, neon, argon, krypton, xenon, and radon. Ultra high purity hydrogen, oxygen and inert gases are preferred but lesser qualities can also be utilized to achieve a less pure result.

The ratio of an inert gas to hydrogen is preferably limited so that hydrogen does not exceed a relatively low level such as 8% of the resulting mixture. 8% hydrogen in air or oxygen containing atmospheres is generally accepted as the lowest concentration at which hydrogen could auto-ignite or cause an explosion. Greater concentrations of hydrogen can also be utilized but with increased risk of fire, auto-ignition or explosion. Lesser concentrations of hydrogen can also be utilized, but will require proportionately higher total gas flow rates to regenerate the water vapor sorption material 620 to capacity in the same time period. This is due to the fact that the water holding capacity of molecular sieves, for example, is constant (when measured in grams water adsorbed/gram dry adsorbent) for equilibrium partial pressures of water above 0.01 psia and below 25° Celsius.

Figure 7:
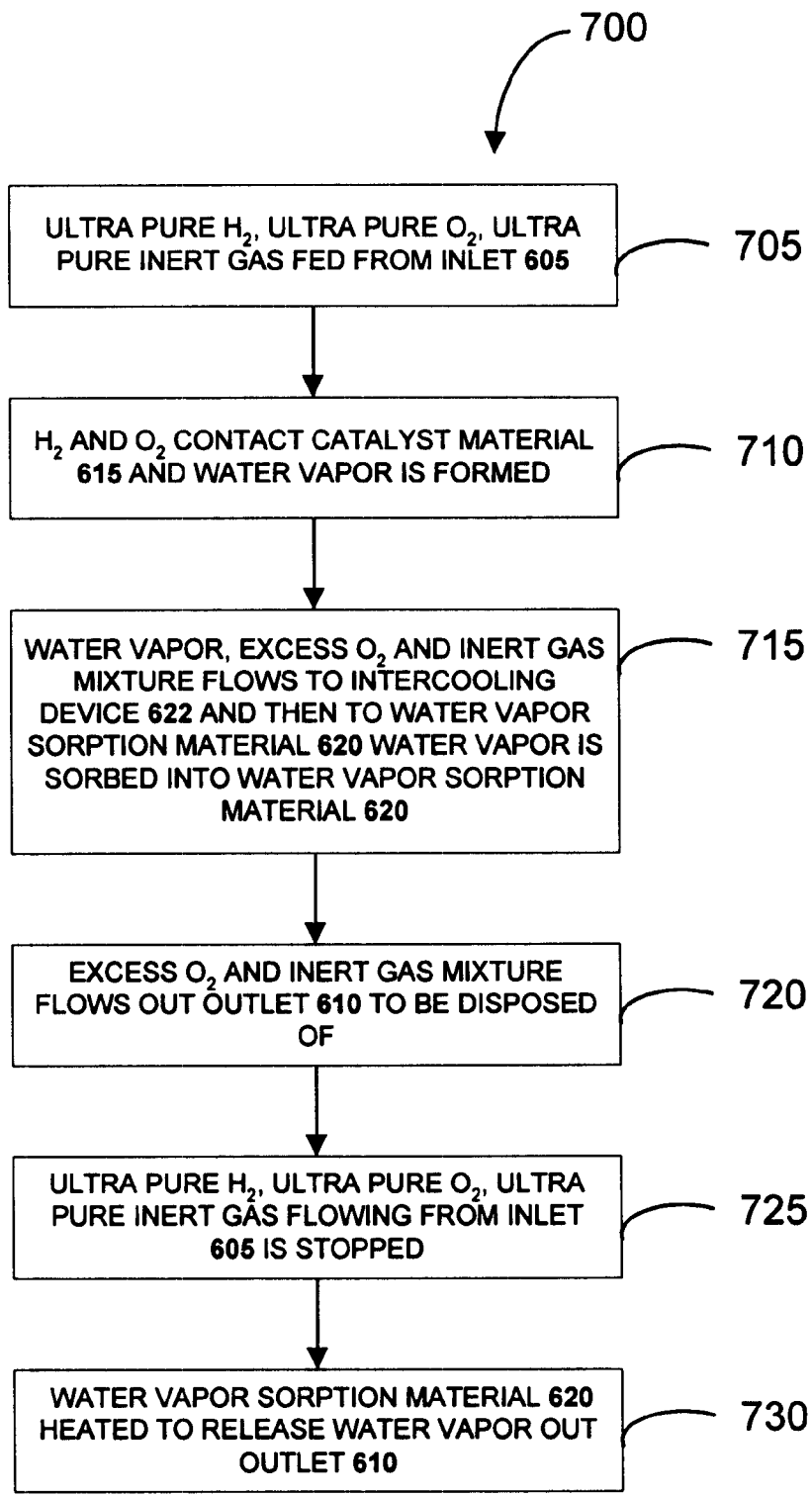
FIG. 7 illustrates a process flow chart for the first embodiment.

FIG. 7 illustrates a process flow chart for the first embodiment of the present invention. The process 700 for one embodiment includes a first operation 705 where ultra-pure hydrogen gas, ultra-pure oxygen gas and ultra-pure inert gas are fed simultaneously from the inlet 605 of the vessel 600. Next, in operation 710, the hydrogen and oxygen contact with the catalyst material 615 to enhance reactivity, thereby producing water from hydrogen and oxygen. Then in operation 715, the water vapor and inert gas mixture flows from the catalyst material 615, through the intercooling device 622, to the sorption material 620. The water vapor sorption material 620 sorbs the water vapor from the water vapor and inert gas mixture and any excess reactants, hydrogen or oxygen.

In a next operation 720 the inert gas and excess reactants are released though the outlet 610 of the chamber 600 and directed to an exhaust vent through piping external to the present invention. Outlet water vapor concentration can be monitored in step 720 to determine "breakthrough". Breakthrough is defined as the point at which the water concentration leaving the water vapor sorption material 620 equals the concentration entering the water vapor sorption material 620. At breakthrough, the water vapor sorption material 620 is at full capacity. Then, in operation 725, the hydrogen gas, oxygen gas and inert gas flowing from the inlet 605 of the chamber 600 are stopped. Next in operation 730, the water vapor sorption material 620 is heated to release high concentrations of ultra-pure water vapor from the outlet 610. The temperature of the water vapor sorption material 620 determines the pressure of the water vapor at the outlet 610. The rate of energy used to heat the sorption material 620 determines the rate of vapor leaving the system.

The process for the first embodiment can be controlled manually but an automated control system is preferred. One embodiment is preferably operated to remove substantially all of the inert gas and excess $O_2$ from the water vapor sorption material 620 by cycle purging the water vapor sorption material 620 before utilizing the water vapor. Cycle purging requires calculating the void volume of vessel 600 and then heating the water vapor sorption material 620 until three to six void volumes of water vapor have been released to an exhaust vent. These volumes of water vapor transport substantially all excess $O_2$ and inert gases from the water vapor sorption material 620.

One embodiment as described above is operable to deliver ultra-pure water vapor in periodic cycles. First, the water vapor sorption material 620 must be charged with water vapor, then the water vapor sorption material 620 is heated to release water vapor. When substantially all of the water vapor has been released from the water vapor sorption material 620, then the cycle must repeat and water vapor flow is thereby interrupted. In an alternative embodiment, a plurality of these systems can be coupled in parallel and operated in a timed sequence such that at least one of the plurality of systems is delivering water vapor while the others are charging the water vapor sorption material 620 with water.

Figure 8:
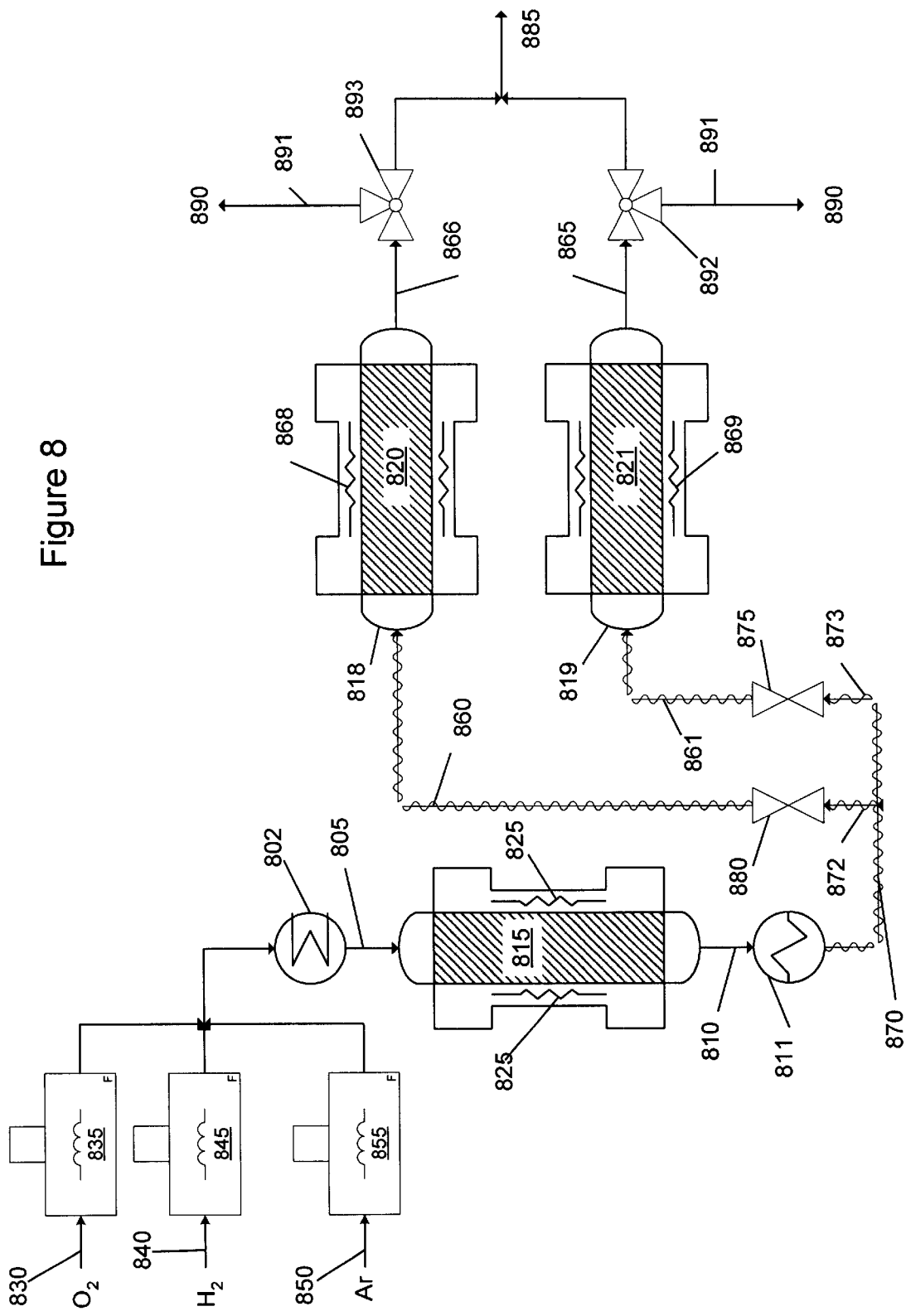
FIG. 8 illustrates a multiple vessel embodiment of the present invention.

A second embodiment of the present invention, as illustrated in FIG. 8, provides continuous ultra high purity water vapor flow. The second embodiment includes a catalyst vessel 800 having an inlet 805 and an outlet 810, a quantity of catalyst material 815 disposed within the catalyst vessel 800 and a catalyst vessel heat source 825. An oxygen gas inlet 830, in fluid communication with the inlet 805 and an oxygen gas flow control 835. A hydrogen gas inlet 840, also in fluid communication with the inlet 805 and a hydrogen gas flow control 845. An inert gas inlet 850, also in fluid communication with the inlet 805 and an inert gas flow control 855 are also included. An intercooling device 811 is also included. The intercooling device 811 can include air, water or gas to gas cooling media. In an alternative embodiment, the catalyst vessel heat source 825 includes a separate preheater 802 which heats the inlet gas mixture as it enters the inlet 805.

The second embodiment further includes a plurality of sorption vessels 818, 819, each sorption vessel 818, 819 has an inlet 860, 861 and an outlet 865, 866 and a quantity of water vapor sorption material 820 disposed within the sorption vessel 818, 819. Each sorption vessel 818, 819 further includes a sorption vessel heat source 868, 869. A quantity of interconnecting piping 870 sufficient to connect the outlet of the intercooling device 811 to the inlet 860, 861 of each sorption vessel 818, 819. Flow control valves 875, 880 are disposed within the interconnecting piping 870. A system outlet 885, a system vent 890 and a quantity of outlet piping 891 sufficient to connect the outlet 865, 866 of each sorption vessel 818, 819 to the system outlet 885 and the system vent 890. Outlet control valves 892, 893 are disposed within the outlet piping 891. In an alternative embodiment, the interconnecting piping heat source 872, 873 may also be included to maintain the temperature of the interconnecting piping 870. Additionally or alternatively, interconnecting piping heat source 872, 873 may also be utilized on the outlet piping 891.

An overview of the process for the second embodiment includes three sub-processes: A continuous water vapor generation sub-process, a sorb vessel regeneration sub-process followed by a water vapor generation sub-process.

Figure 9A:
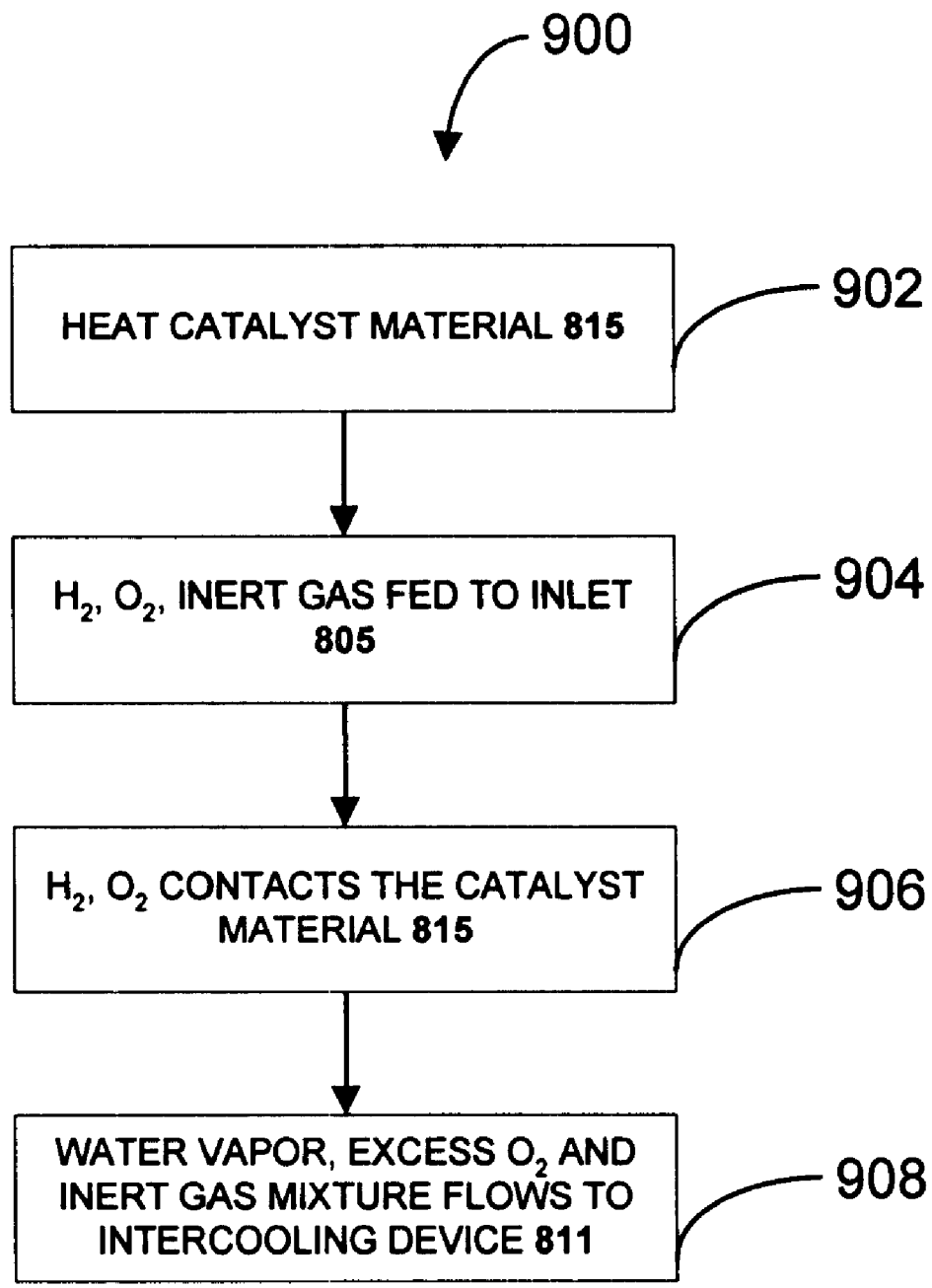
FIG. 9a illustrates a flow chart for a multiple vessel embodiment of the present invention.

FIG. 9a illustrates the continuous water vapor generation sub-process 900. In a first operation 902, the catalyst material is heated to an operating temperature of about 100 to 400° C. by the catalyst vessel heat source 825. Then, in operation 904, ultra-pure hydrogen gas, ultra-pure oxygen gas and ultra-pure inert gas are fed simultaneously from the inlet 805 of the catalyst vessel 800. Next, in operation 906, the hydrogen and oxygen contacts the catalyst material 815 to enhance reactivity, thereby producing water from hydrogen and oxygen. Then in operation 908, the water vapor, excess oxygen and inert gas mixture flows from the catalyst vessel 800 to the intercooling device 811 and the to the flow control valves 875, 880. The intercooling device 811 cools the water vapor, excess oxygen and inert gas mixture. Then, the sorption vessel 818, 819 regeneration sub-process begins. From the flow control valves 875, 880 the water vapor, excess oxygen and inert gas mixture flow is directed to the appropriate sorption vessel 818 or 819.

FIG. 9b illustrates the sorption vessel 818 regeneration and water vapor generation sub-processes 920. A water vapor sorption material 820 regeneration sub-process begins in operation 930 flow control valve 880 is opened, outlet control valve 893 is opened to vent 890 and flow control valve 875 is closed, causing the water vapor, excess oxygen and inert gas mixture to flow into the sorption vessel 818. In operation 932, as the mixture flows through the sorption vessel 818, the water vapor sorption material 820 sorbs the water vapor from the mixture. The excess oxygen and inert gas continue to flow out the vent 890. Operation 932 continues for a specified time or other method to determine when a selected quantity of water vapor has been sorbed by the water vapor sorption material 820. When the selected quantity of water vapor has been sorbed by the water vapor sorption material 820, then, in an operation 934, flow control valve 880 is closed and outlet control valve 893 is closed, causing the water vapor, excess oxygen and inert gas mixture to stop flowing into the sorption vessel 818.

Next, the water vapor generation process begins in an operation 940, the outlet control valve 893 is opened to outlet 885. Then in operation 942, the sorption vessel heat source 868 is activated to heat the water vapor sorption material 820 causing water vapor to begin to flow from the sorption vessel 818 to the outlet 885. Operation 942 continues for a specified time or other method to determine when a selected quantity of the water vapor has been substantially depleted from the sorption material 820. After operation 942 is completed, in operation 944, the outlet control valve 893 is closed and the heat source 868 is deactivated.

FIG. 9c illustrates the sorption vessel 819 regeneration and water vapor generation sub-processes 960. A water vapor sorption material 821 regeneration sub-process begins in operation 970 flow control valve 875 is opened, outlet control valve 892 is opened to vent 890 and flow control valve 880 is closed, causing the water vapor, excess oxygen and inert gas mixture to flow into the sorption vessel 819. In operation 972, as the mixture flows through the sorb vessel 819, the water vapor sorption material 821 sorbs the water vapor from the mixture. The excess oxygen and inert gas continue to flow out the vent 890. Operation 972 continues for a specified time or other method to determine when a selected quantity of water vapor has been sorbed by the water vapor sorption material 821. When the selected quantity of water vapor has been sorbed by the water vapor sorption material 821, then, in an operation 974, flow control valve 875 is closed and outlet control valve 892 is closed, causing the water vapor, excess oxygen and inert gas mixture to stop flowing into the sorption vessel 819.

Next, the water vapor generation process begins in an operation 980, the outlet control valve 892 is opened to outlet 885. Then in operation 982, the sorption vessel heat source 869 is activated to heat the water vapor sorption material 821 causing water vapor to begin to flow from the sorption vessel 819 to the outlet 885. Operation 982 continues for a specified time or other method to determine when a selected quantity of the water vapor has been substantially depleted from the sorption material 821. After operation 982 is completed, in operation 984, the outlet control valve 892 is closed and the heat source 869 is deactivated.

Only one sorption vessel 818, 819 at any one time is required to generate water vapor for the second embodiment of the present invention to generate continuous water vapor flow from the outlet 885. While sorption vessel 818 is generating water vapor, sorption vessel 819 is regenerating, and while sorption vessel 819 is generating water vapor, sorption vessel 818 is regenerating. Through alternating generation and regeneration cycles between the sorption vessels 818, 819, continuous, high concentration ultra-pure water vapor is generated by the system.

Figure 10:
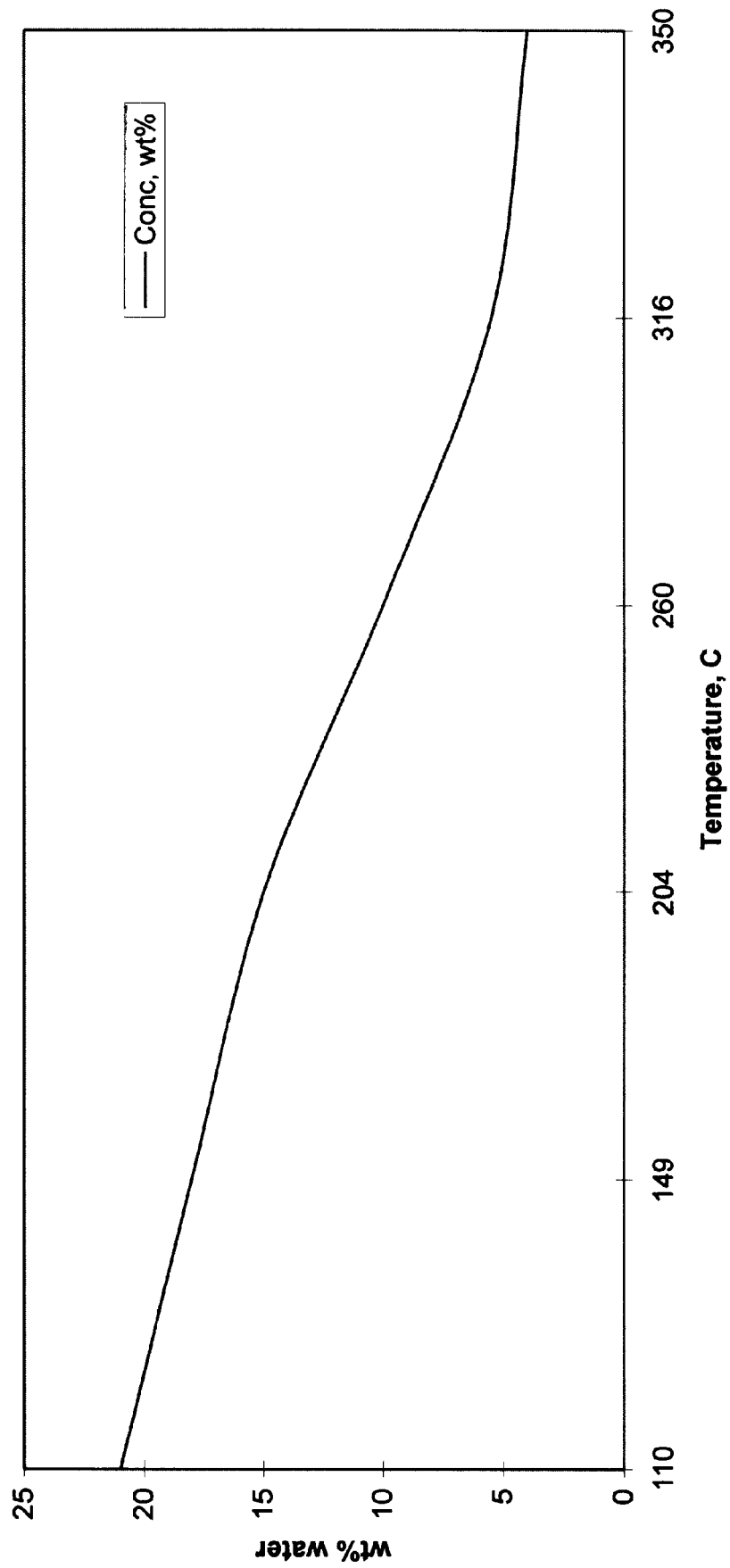
FIG. 10 illustrates a saturation graph of water vapor sorption material data from Table 1.
Figure 11:
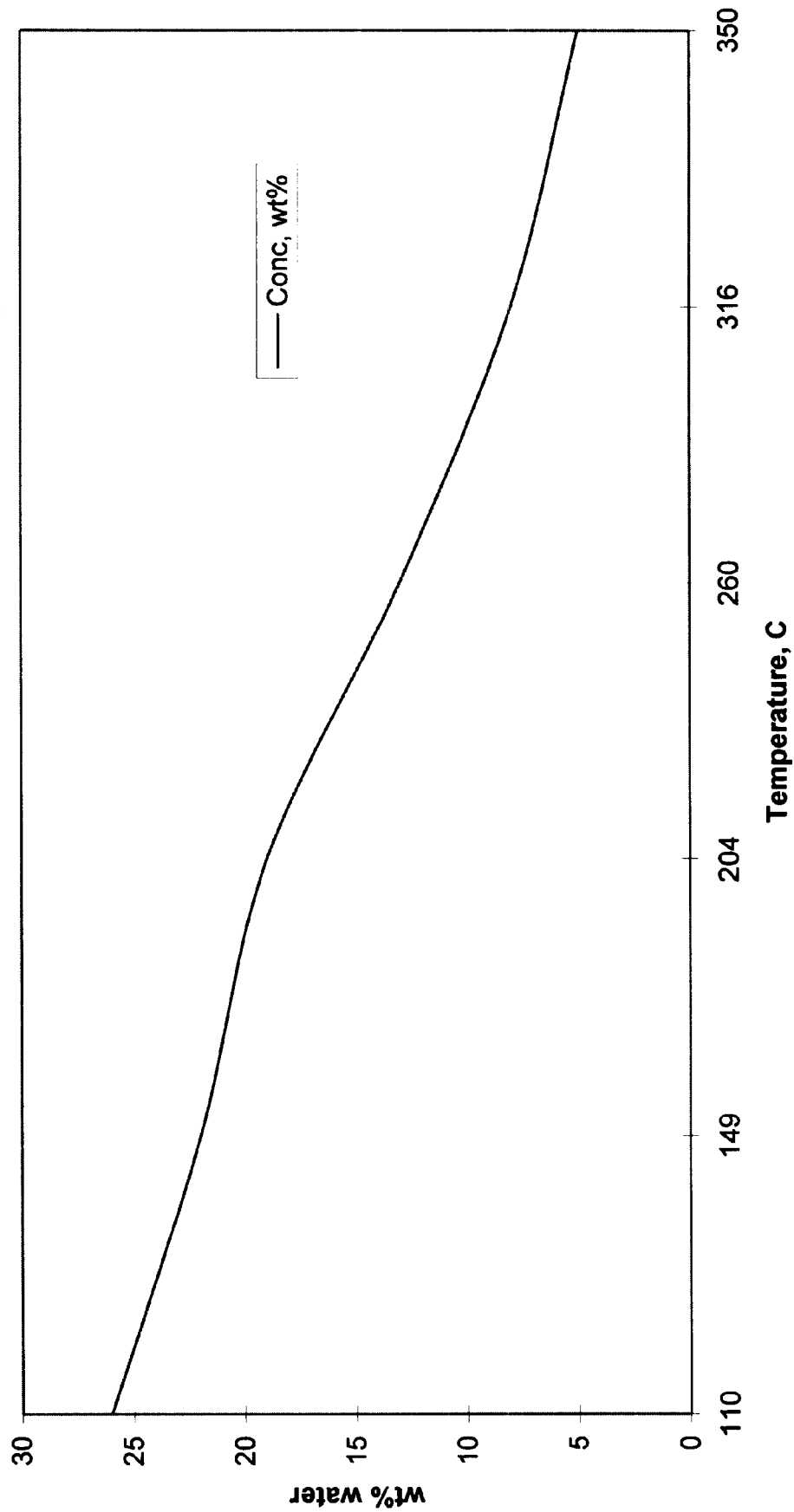
FIG. 11 illustrates a saturation graph of water vapor sorption material data from Table 2.

For example, the second embodiment of the present invention can be scaled to produce 1 standard liter per minute (SLPM) water vapor at 1 atmosphere pressure from water vapor sorption vessels 818, 819. Larger and smaller flow rates are possible through simple scaling of the quantities of water vapor sorption material 820, 821 and catalyst material 815. The quantity of water vapor sorption material is determined by the following relationship:

Given a bed capacity delivery time of 8 hours (1SLPM @ 1 ATM)×(8 hours)=480 standard liters water vapor (480 liters water vapor)×(0.04545 mole/liter)×(18 grams/mole)= 393 grams water vapor Where
0.04545 mole/liter and 18 grams/mole are standard conversion factor constants for water vapor.
Approximate molecular sieve (13×) water vapor capacity=20 wt %, net (26% saturated−6%, 350° C.)
(393 grams)/ (20 wt %)=1965 grams molecular sieve
The sorption vessel fill time must be less than or equal to 8 hours in this example, and is determined by the inlet gas feed rates of hydrogen, oxygen and inert gas.
4% hydrogen gas in inert gas @ 50 psig Inlet flow rate=480 standard liters hydrogen/8 hrs=1 slpm hydrogen=25 slpm 4% mixture Table 1 and Table 2 list capacities of typical molecular sieves at various temperatures. FIG. 10 is a graphical representation of the data listed in Table 1. FIG. 11 is a graphical representation of the data listed in Table 2.

TABLE 1

5A molecular sieve at 1 atm Partial Pressure

| ° C. | Conc. Wt. % |
|---|---|
| 110 | 21 |
| 149 | 18 |
| 204 | 15 |
| 260 | 10 |
| 316 | 5.5 |
| 350 | 4 |

TABLE 2

13X molecular sieve at 1 atm Partial Pressure

| ° C. | Conc. Wt. % |
|---|---|
| 110 | 26 |
| 149 | 22 |
| 204 | 19 |
| 260 | 13 |
| 316 | 8 |
| 350 | 5 |

Figure 12:
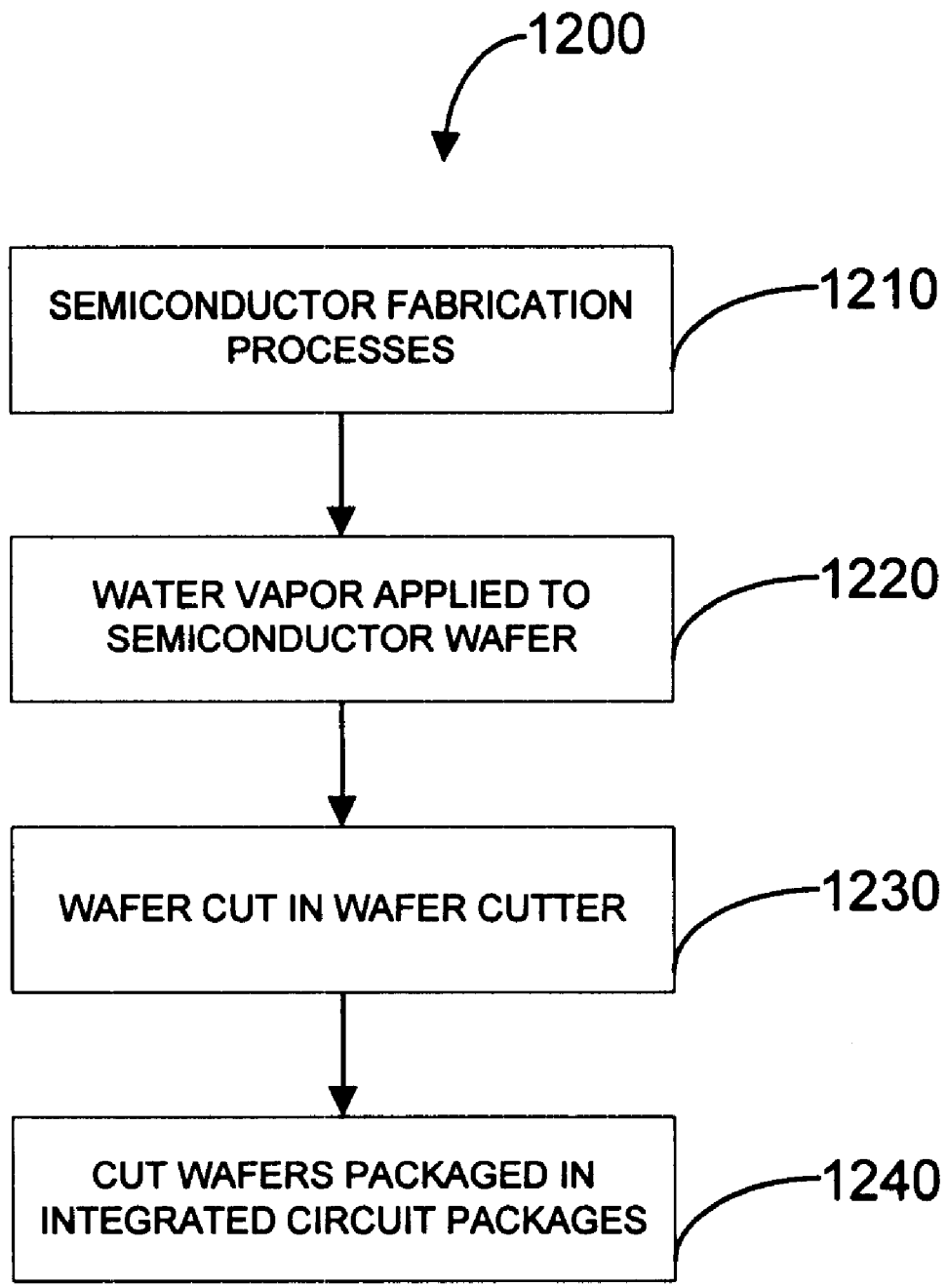
FIG. 12 illustrates an integrated circuit manufacturing process flow chart.

FIG. 12 illustrates an integrated circuit manufacturing process 1200 utilizing the present invention. In an operation 1210, a semiconductor wafer is subjected to at least one of a plurality of semiconductor fabrication processes. Then, in an operation 1220, a semiconductor wafer is subjected to a process which applies water vapor to the semiconductor wafer, wherein the water vapor is generated by the present invention. Next in an operation 1230, the semiconductor wafer is cut and then in an operation 1240, the cut semiconductor wafer is packaged into an integrated circuit package.

Figure 13:
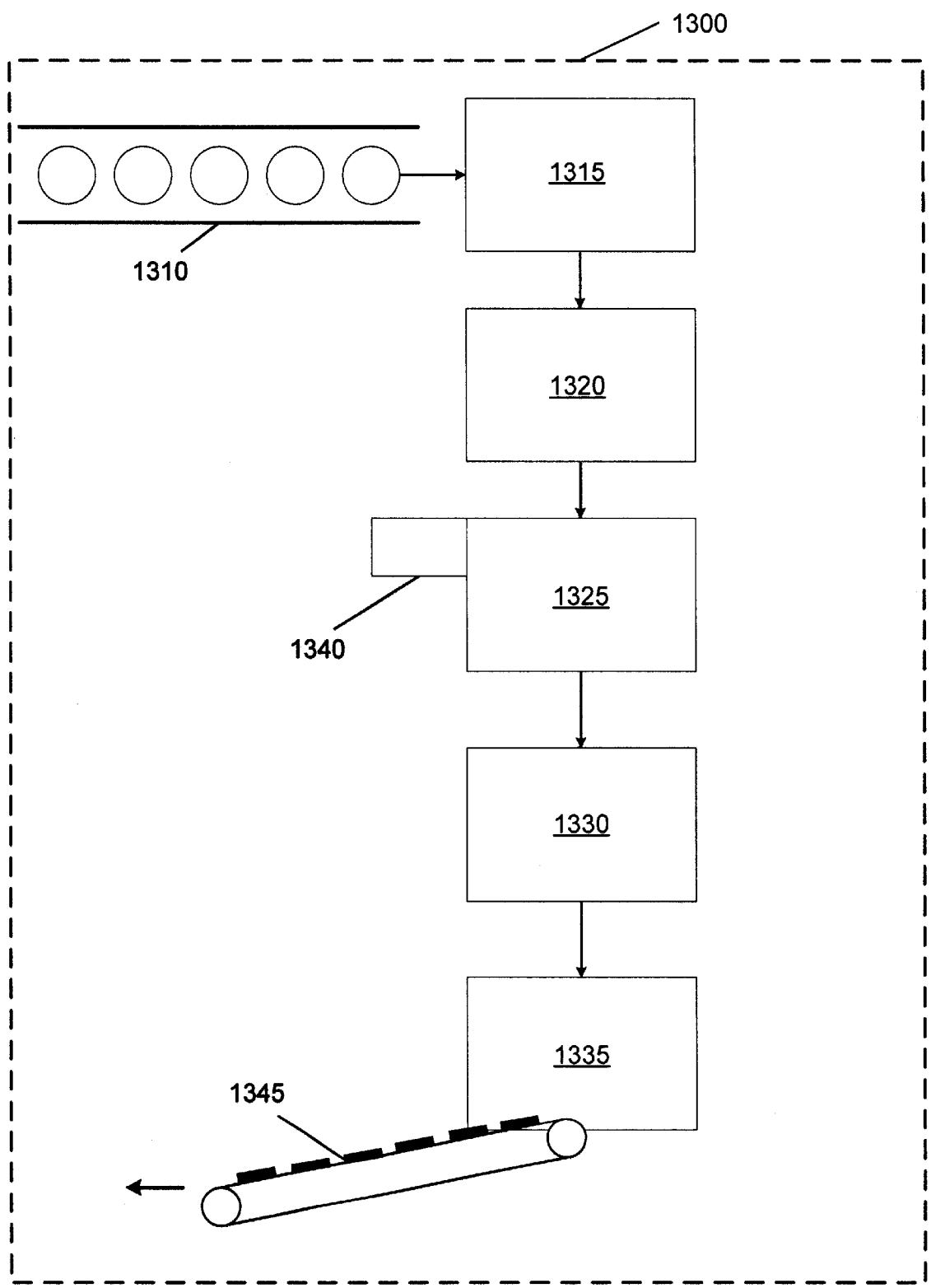
FIG. 13 illustrates an integrated circuit manufacturing facility utilizing the present invention.

FIG. 13 illustrates an integrated circuit manufacturing facility 1300 utilizing the present invention. A plurality of semiconductor wafers 1310 enter the facility 1300. Within the facility 1300, the plurality of semiconductor wafers 1310 are processed through a plurality of process tools 1315, 1320, 1325, 1330, 1335. Process tool 1325 includes the present invention 1340. The plurality of semiconductor wafers 1310 proceed from process tool 1315 to process tool 1320, to process tool 1325, to process tool 1330 and then to process tool 1335. Process tool 1330 includes a semiconductor wafer cutting apparatus. Process tool 1335 includes an integrated circuit packaging apparatus. From process tool 1335, a plurality of completed integrated circuits 1345 are output. Additional process tools and semiconductor manufacturing facilities can also be included.

Although only a few embodiments of the present invention have been described in detail herein, it should be understood that the present invention can be embodied in many other specific forms without departing from the spirit or scope of the invention. Therefore, the present examples and embodiments are to be considered as illustrative and not restrictive, and the invention is not to be limited to the details given herein, but can be modified within the scope of the appended claims.

I claim:
1. A method of generating water vapor, comprising:
simultaneously flowing a quantity of an inert gas, a quantity of hydrogen and a quantity of oxygen through a catalyst, whereby a portion of said quantity of hydrogen and a portion of said quantity of oxygen react to form a quantity of water vapor;

cooling said water vapor, said inert gas, an unreacted portion of said quantity of hydrogen and an unreacted portion of said quantity of oxygen;

flowing said water vapor, said inert gas, said unreacted portion of said quantity of hydrogen and said unreacted portion of said quantity of oxygen into a quantity of sorb material capable of sorbing said water vapor;

flowing said inert gas, said unreacted portion of said quantity of oxygen and said unreacted portion of said quantity of hydrogen through said sorb material to a vent; and heating said sorb material to release water vapor from said sorb material.

2. A method of generating water vapor as recited in claim 1, wherein the flow of said inert gas, said unreacted portion of oxygen and said unreacted portion of hydrogen through said sorb material is stopped before said sorb material is heated.

3. A method of generating water vapor as recited in claim 2, wherein said sorb material is heated to release water vapor from said sorb material for a period of time, whereby substantially all of said inert gas, said unreacted portion of oxygen and said unreacted portion of hydrogen are removed from the sorb material.

4. A method of generating water vapor as recited in claim 1, wherein said quantity of oxygen is greater than a quantity of oxygen substantially sufficient to oxidize substantially all of said quantity of hydrogen.

5. A method of generating water vapor as recited in claim 1, wherein the proportion of said hydrogen and said inert gas does not exceed 8 percent hydrogen.

6. A method of generating water vapor as recited in claim 1, wherein said inert gas and said hydrogen are mixed prior to contact with said oxygen and the catalyst.

7. A method of generating water vapor as recited in claim 1, wherein said inert gas is at least 99.99% pure.

8. A method of generating water vapor as recited in claim 1, wherein said hydrogen is at least 99.99% pure.

9. A method of generating water vapor as recited in claim 1, wherein said oxygen is at least 99.99% pure.

10. A method of generating water vapor as recited in claim 1, wherein the rate of flow of water vapor from said sorb material is determined by the temperature of the sorb material.

11. A method for manufacturing an integrated circuit device comprising:

subjecting an active surface of a semiconductor wafer to a plurality of semiconductor fabrication processes wherein one of said processes includes applying water vapor generated by a process including:

simultaneously flowing a quantity of an inert gas, a quantity of hydrogen and a quantity of oxygen through a catalyst, whereby a portion of said quantity of hydrogen and a portion of said quantity of oxygen react to form a quantity of water vapor;

cooling said water vapor, said inert gas, an unreacted portion of said quantity of hydrogen and an unreacted portion of said quantity of oxygen;

flowing said water vapor, said inert gas, said unreacted portion of said quantity of hydrogen and said unreacted portion of said quantity of oxygen into a quantity of sorb material capable of sorbing said water vapor;

flowing said inert gas, said unreacted portion of said quantity of oxygen and said unreacted portion of said quantity of hydrogen through said sorb material to a vent;

heating said sorb material to release water vapor from said sorb material;

cutting said semiconductor wafer; and packaging said cut semiconductor wafer into a integrated circuit package.

12. A method of generating water vapor as recited in claim 1, wherein said sorb material comprises a molecular sieve.

13. A method of generating water vapor as recited in claim 1, wherein said sorb material comprises silica gel.

14. A method of generating water vapor as recited in claim 11, wherein said inert gas and hydrogen are mixed externally from the catalyst.

15. A method of generating water vapor as recited in claim 11, wherein said sorb material comprises silica gel.

16. A method of generating water vapor as recited in claim 11, wherein said sorb material comprises a molecular sieve.

* * * * *